US006378855B1

(12) United States Patent
Sawdon et al.

(10) Patent No.: US 6,378,855 B1
(45) Date of Patent: Apr. 30, 2002

(54) LOCKING PIN CLAMP

(75) Inventors: Edwin G. Sawdon, St. Clair; Brian D. Petit, Algonac, both of MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 09/426,623

(22) Filed: Oct. 26, 1999

(51) Int. Cl.[7] .................................................. B23Q 3/08

(52) U.S. Cl. .......................................................... 269/32

(58) Field of Search ........................ 269/32, 24, 91–94, 269/228, 233, 232, 229, 237

(56) References Cited

U.S. PATENT DOCUMENTS

| | | | |
|---|---|---|---|
| 2,313,843 A * | 3/1943 | Shaff ........................... | 269/32 |
| 5,165,670 A | 11/1992 | Sawdon | |
| 5,190,334 A | 3/1993 | Sawdon | |
| 5,853,211 A | 12/1998 | Sawdon et al. | |
| 5,871,250 A | 2/1999 | Sawdon | |
| 5,884,903 A | 3/1999 | Sawdon | |
| 6,102,383 A * | 8/2000 | Tunkers ....................... | 269/32 |

FOREIGN PATENT DOCUMENTS

EP 0 256 208 A2 2/1988

OTHER PUBLICATIONS

Namco Sensors, http://omnicontrols.com/lists/namco2pm.html, Aug. 30, 1999.
Turck Proximity Sensors, http://www.turck.com, Aug. 30, 1999.
Brochure of Bay Products, Inc., (prior to Oct. 26, 1999).
Brochure of Bimba, (prior to Oct. 26, 1999).
Namco Sensors, http://www.inotek.com/Catalog/namco2pm.html, Aug. 30, 1999.
Expanding Pin Clamp drawing from E&E Engineering (believed to have been quoted or publicly used before Oct. 26, 1999), 3 sheets.
Special Order Cylinder (Clamp Cylinder) drawings from SMC Corporation (believed to have been quoted or publicly used before Oct. 26, 1999), 3 sheets.

* cited by examiner

*Primary Examiner*—Robert C. Watson
(74) *Attorney, Agent, or Firm*—Harness, Dickey & Pierce, P.L.C.

(57) ABSTRACT

A clamp employs a workpiece-clamping member, a clamp body, and a driving member. A further aspect of the present invention provides a camming mechanism to couple a clamping member to a camming member. Still another aspect of the present invention employs a piston and a clamping member wherein the piston advances in a direction generally perpendicular to a direction of movement of the clamping member.

61 Claims, 10 Drawing Sheets

FIG. 7.
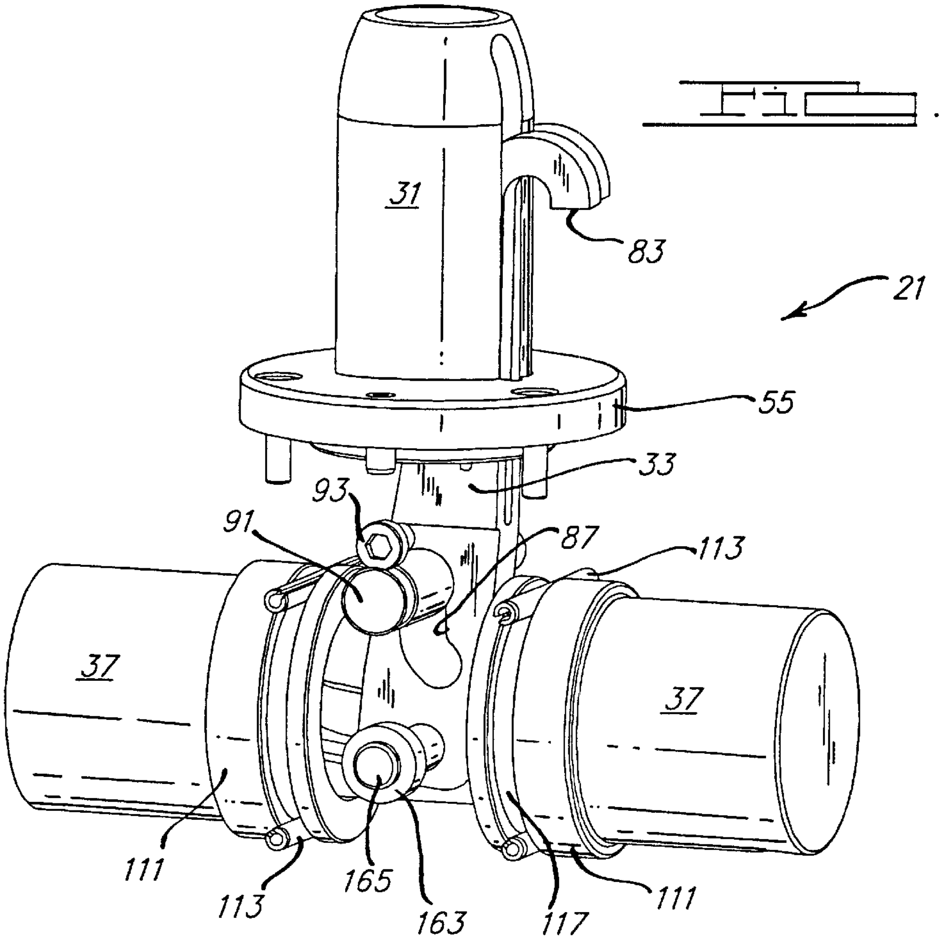
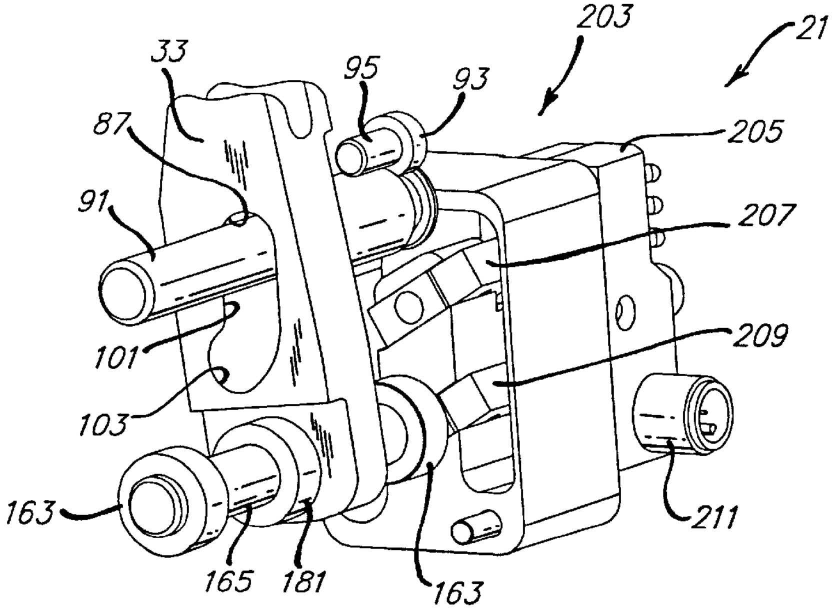
FIG. 8.

LOCKING PIN CLAMP

BACKGROUND AND SUMMARY OF THE INVENTION

The present invention relates generally to a clamp and more specifically to a fluid powered, locking pin clamp.

Automated or powered clamps have been commonly used to secure workpieces, such as sheet metal automotive vehicle body panels, polymeric parts and the like in checking fixtures, gauging stations, welding stations and punching machines. Many existing clamps are powered by hydraulic or pneumatic fluid pressure. For example, reference should be made to the following U.S. Patents, which have been invented by Sawdon: U. S. Pat. No. 5,884,903 entitled "Powered Clamp Gauging Apparatus" which issued on Mar. 23, 1999; U.S. Pat. No. 5,165,670 entitled "Retracting Power Clamp" which issued on Nov. 24, 1992; and U.S. Pat. No. 5,190,334 entitled "Powered Clamp with Parallel Jaws" which issued on Mar. 2, 1993; all of which are incorporated by reference herein.

It has recently become desirable to prevent a gripping arm from opening and releasing the workpiece if there is a loss of fluid pressure. Gripper constructions employing such a feature are disclosed in U.S. Pat. No. 5,871,250 entitled "Sealed Straight Line Gripper" which issued to Sawdon on Feb. 16, 1999, and U.S. Pat. No. 5,853,211 entitled "Universal Gripper" which issued to Sawdon et al. on Dec. 29, 1998. These patents are also incorporated by reference herein.

In accordance with the present invention, a preferred embodiment of a clamp employs a workpiece-clamping member, a clamp body, and a driving member. In another aspect of the present invention, a fluid actuated piston is operable to drive a clamping member. A further aspect of the present invention provides a camming mechanism to couple a clamping member to a camming member. Still another aspect of the present invention employs a piston and a clamping member wherein the piston advances in a direction generally perpendicular to a direction of movement of the clamping member. A detent arrangement is provided on a camming surface in yet another aspect of the present invention, in order to deter inadvertent unclamping of a workpiece if the desired fluid pressure is not present. Another aspect of the present invention, allows a clamping member to retract into a hollow locating pin extending from a clamp body. A method of operating a clamp is also provided.

The locking pin clamp of the present invention is highly advantageous over traditional clamps in that the moving clamping member of the present invention can be maintained in its clamping position even during loss of piston fluid pressure. This eliminates undesired opening of the clamping member which can lead to inadvertent dropping and damage of the workpiece. The present invention is also advantageous in that the clamping member can be retracted into a locating pin whereby the workpiece can first be located relative to the clamp body and then clamped against the clamp body, in a single, compact and multi-functional package; thus, the clamping member does not need to be remotely located away from the target locating pin. Furthermore, the present invention allows for four point equidistant locating or gauging against the workpiece even when openings are provided in the locating pin for passage of the clamping member. This four point locating and contacting against the workpiece provides accurate workpiece-to-pin alignment that coincides with the typically designed geometric tolerancing and dimensioning characteristics of the workpiece.

The specific perpendicular orientation of the piston movement relative to the general direction of clamping member movement advantageously encourages locking of the clamping member in the clamping position if fluid pressure is not present. Moreover, this generally perpendicular arrangement is resistant to being back driven and is further maintained in the clamping position by use of a set of detent formations located along a camming surface. Another advantage of the present invention is the ability to rotate one or more piston cylinders 360 degrees relative to the body even after the piston cylinder is fully installed in the body. This allows for convenient routing of fluid carrying tubes and fittings to the piston cylinders free of adjacent obstructions in the manufacturing facility. Additional advantages and features of the present invention will become apparent from the following description and appended claims, taken in conjunction with the accompanying drawings.

BRIEF DESCRIPTION OF THE DRAWINGS

FIG. 7 is a perspective view showing the first preferred embodiment locking pin clamp, with a clamp body removed;

FIG. 8 is a fragmentary perspective view showing a second preferred embodiment of the locking pin clamp of the present invention, with the body and a piston removed;

DETAILED DESCRIPTION OF THE PREFERRED EMBODIMENTS

Figure 1:
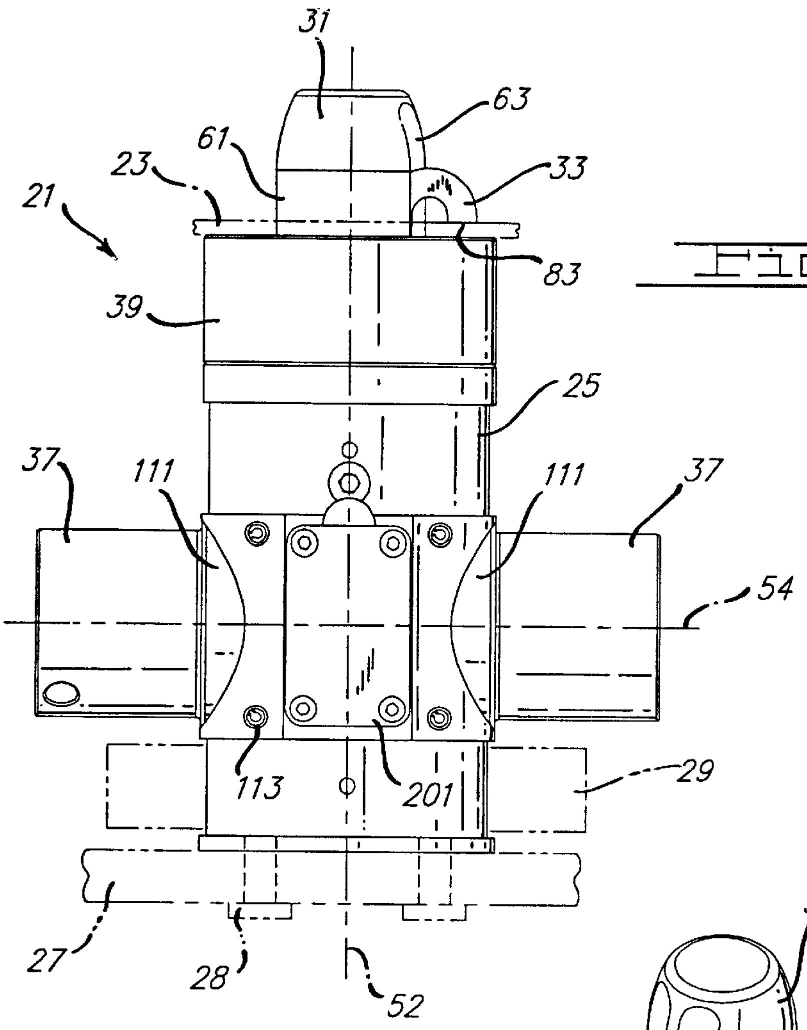
FIG. 1 is a side elevational view showing the first preferred embodiment of a locking pin clamp of the present invention.
Figure 2:
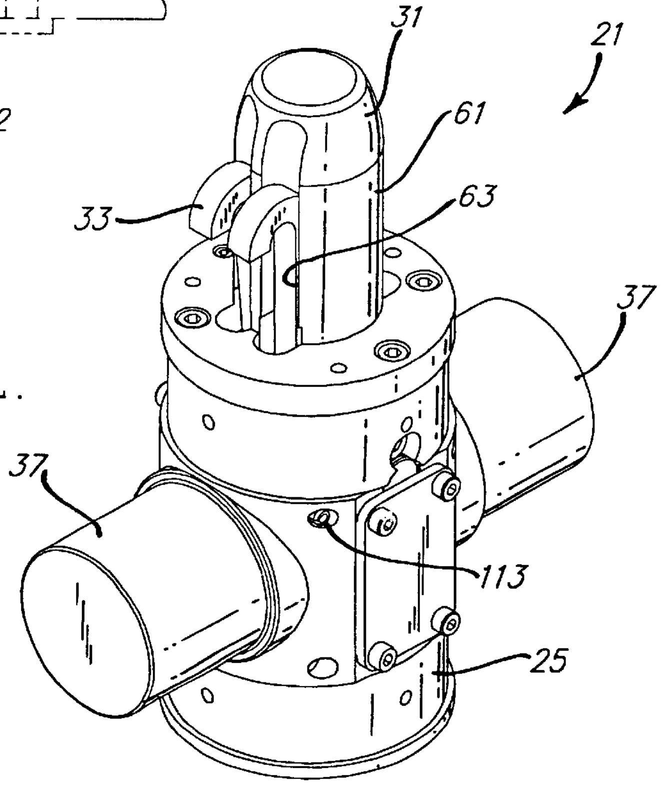
FIG. 2 is a perspective view showing the first preferred embodiment locking pin clamp.
Figure 3:
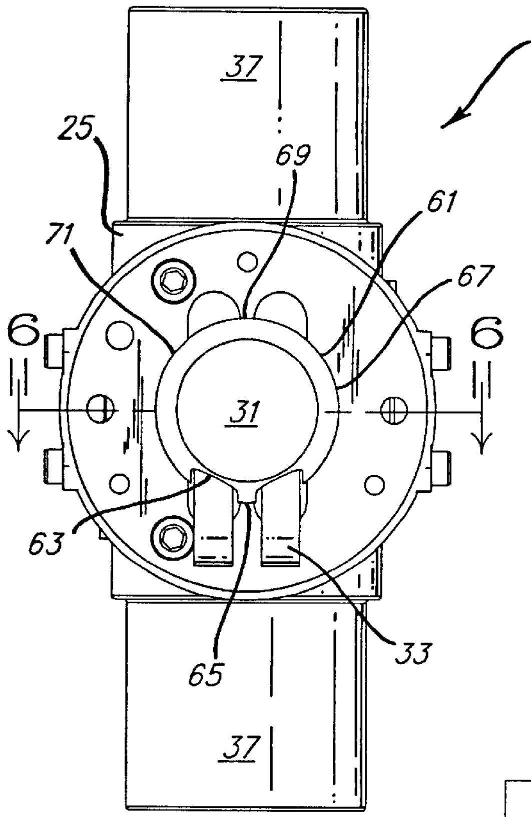
FIG. 3 is a top elevational view showing the first preferred embodiment locking pin clamp.
Figure 4:
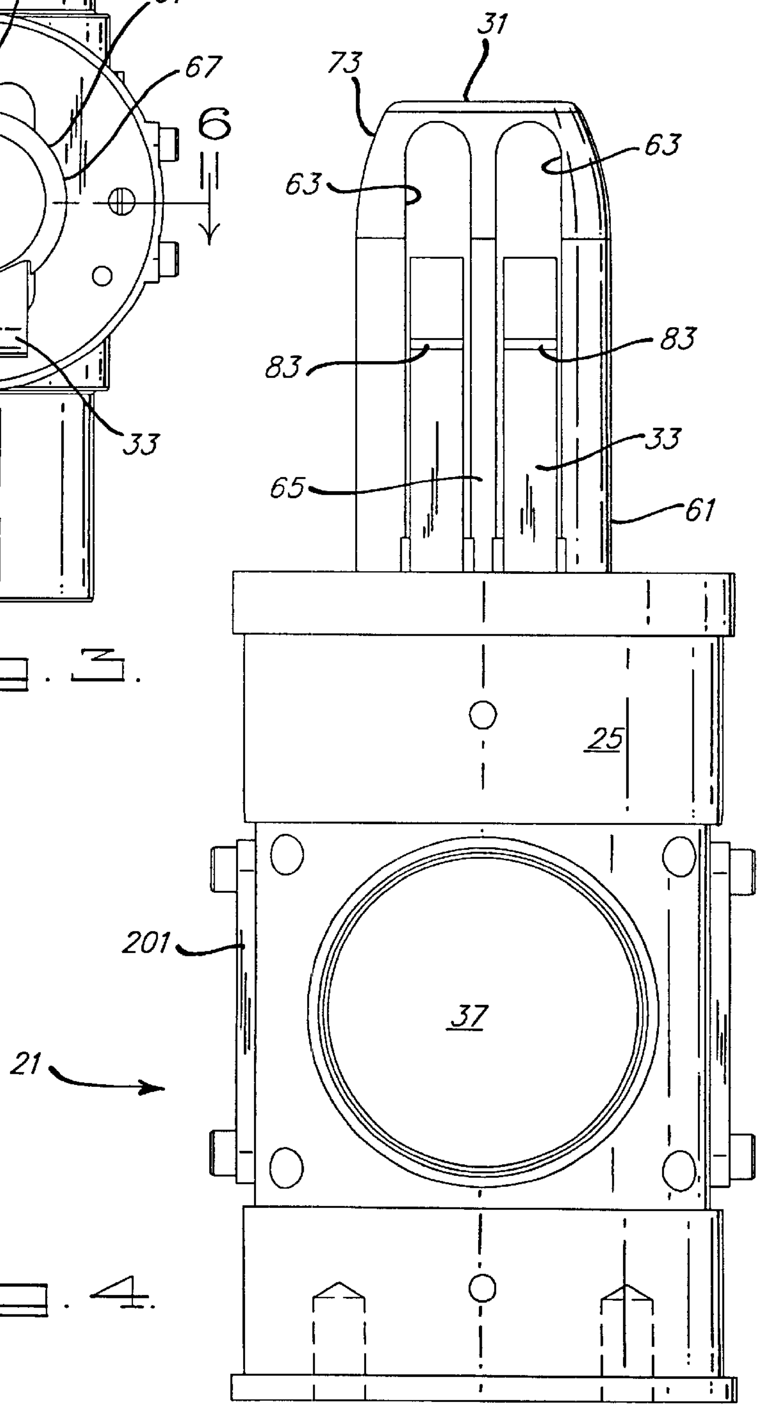
FIG. 4 is a side elevational view, 90 degrees to that of FIG. 1, showing the first preferred embodiment locking pin clamp.
Figure 5:
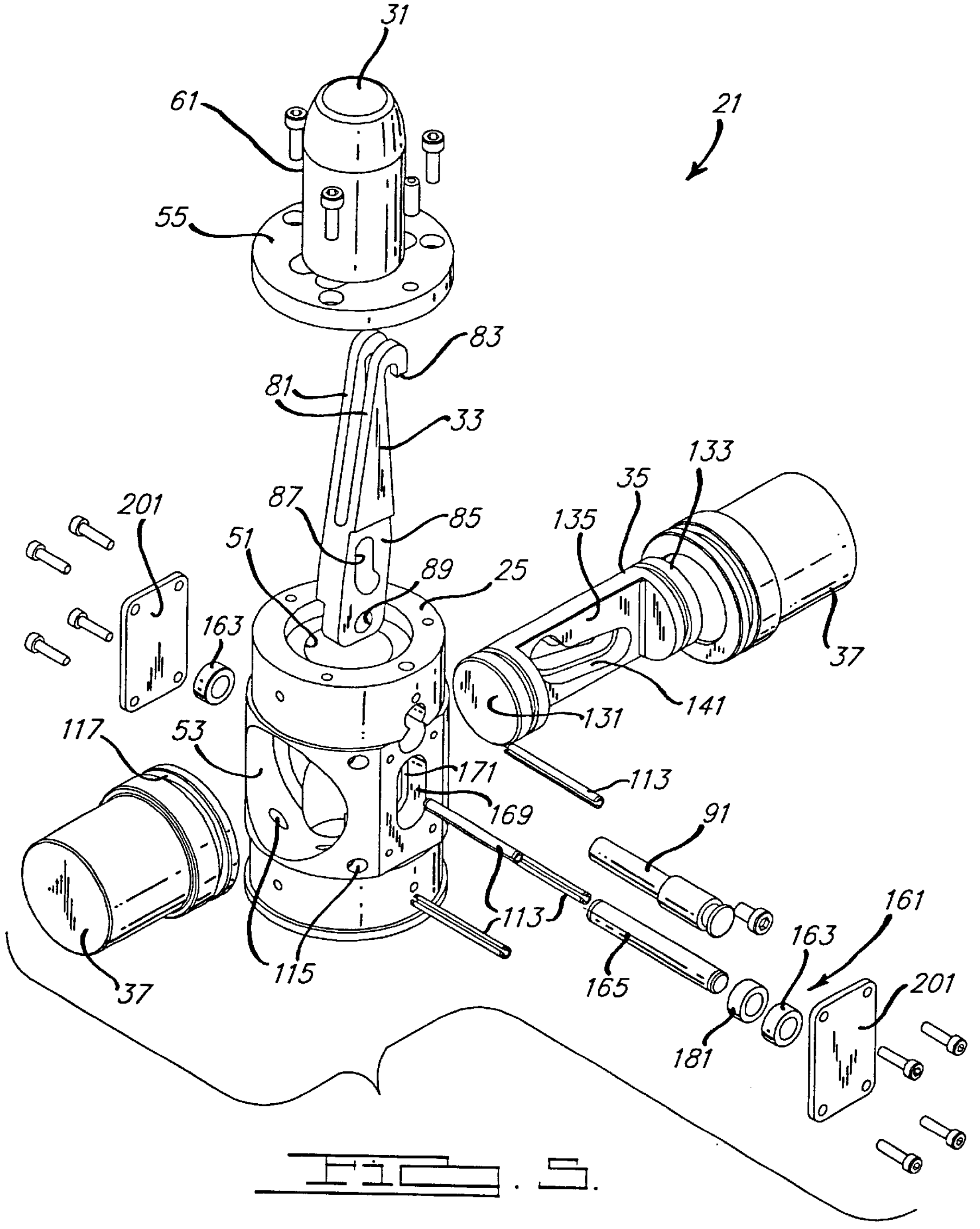
FIG. 5 is an exploded perspective view showing the first preferred embodiment locking pin clamp.
Figure 6:
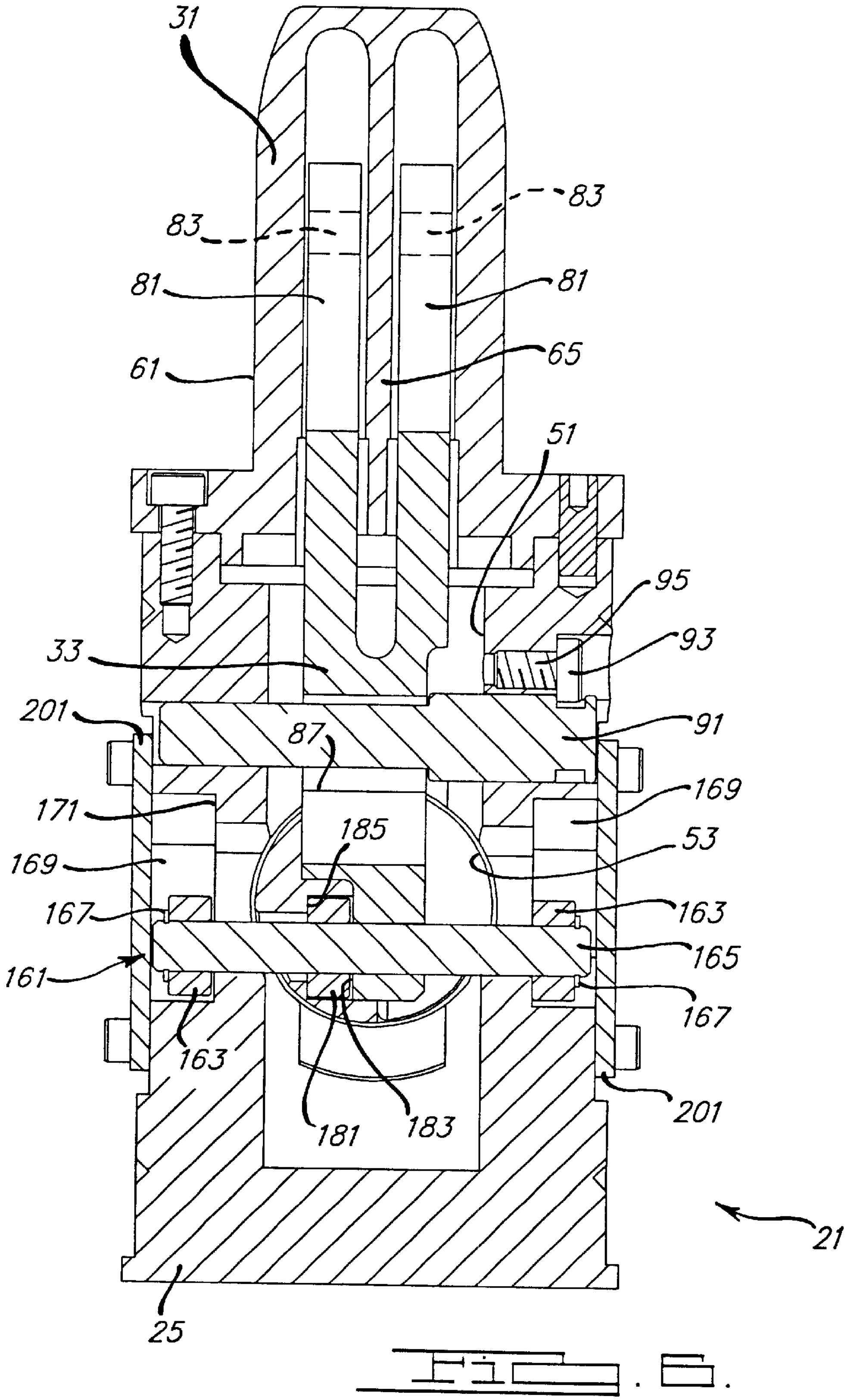
FIG. 6 is a cross sectional view, taken along line 6—6 of FIG. 3, showing the first preferred embodiment locking pin clamp.
Figure 9:
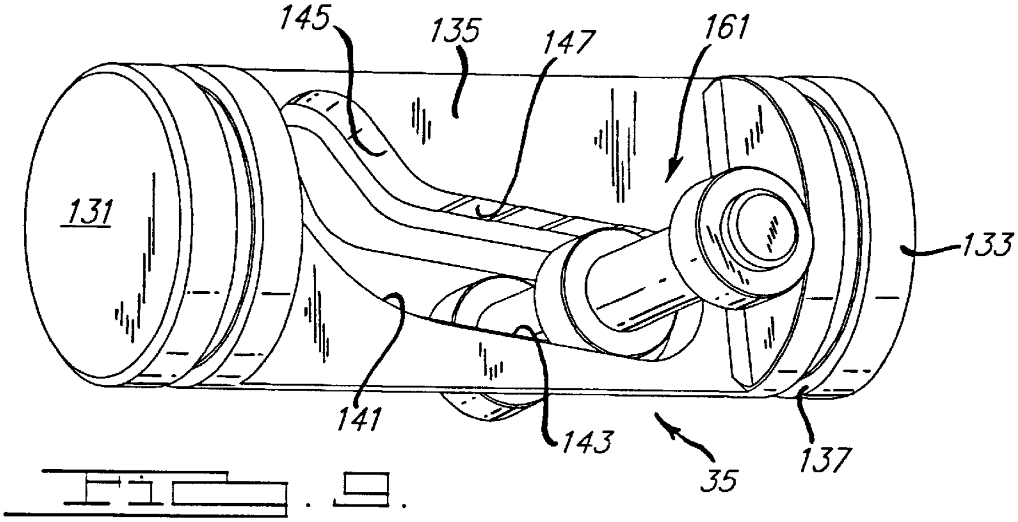
FIG. 9 is a perspective view showing a camming mechanism for the piston employed in the first preferred embodiment locking pin clamp.

Referring to FIGS. 1–7, a first preferred embodiment of a locking pin clamp 21 of the present invention is used to locate or gauge and then clamp a workpiece 23 on a moving assembly line, in a start-and-stop manufacturing station, or in an off-line work cell. A clamp body 25 is affixed to a stationary mount or table 27 by way of two threaded screws 28 and two adjustable dowels (not shown) or can be attached to an end arm effector 29 secured to a robotic arm. Thus, workpiece 23 can be moved relative to the stationarily mounted clamp 21 or clamp 21 can be moved relative to a stationarily mounted workpiece 23.

Clamp 21 includes a hollow locating pin 31, a clamping member 33, a piston 35, a pair of piston cylinders 37 and a collar 39. Clamp body 25 has a first longitudinally elongated internal bore 51 having a central axis 52 and a second transversely elongated internal bore 53 having a central axis 54. A shoulder 55 transversely extends around the base of locating pin 31 and is bolted onto a working end of body 25. Accordingly, locating pin 31 outwardly extends in an elongated manner from body 25 such that an internal hollow cavity 57 (see FIG. 10) is elongated coaxial with axis 52. Locating pin 31 has a circular-cylindrical external side surface 61 interrupted by a pair of longitudinally elongated openings 63. Openings 63 are spaced away from each other and separated by a solid remaining portion 65 of external side surface 61; this remaining portion 65 serves as one of four equidistant contact points, the others being defined as points 67, 69 and 71, which coincide with the geometric tolerancing and dimension characteristics of a hole in workpiece 23. A distal end 73 of locating pin 31 has an arcuate taper to ease installation of workpiece 23 in a snugly fitting manner around side surface 61. A circular-cylindrical collar is bolted onto the external surface of shoulder 55 to partially surround a proximal end of locating pin 31. Workpiece 23 is operably clamped between collar 39 and clamping member 33.

Clamping member 33 has a pair of bifurcated and spaced apart clamping arms 81, which have curved portions that end in clamping surfaces 83. Clamping member 33 further has a unitary working portion 85 that contains a camming slot 87 and a hole 89 adjacent a distal end. Working portion 85 is movably positioned in first bore 51 of body 25. Clamping member 33 has a generally J-shaped side view configuration.

A solid pivot pin assembly 91 is stationarily affixed to body 25 by engagement of a bolt head 93 in an undercut of pin assembly 91 while a threaded section 95 of the bolt engages a threaded aperture in body 25. Pin assembly 91 is preferably a single stepped cylindrical pin, but it may also include rollers, bearings or other parts. Pin assembly 91 passes through camming slot 87 of clamping member 33. Camming slot 87 includes a first camming segment 101 (see FIG. 11) generally elongated in the direction of axis 52, which is also the elongated direction of clamping member 33. Camming slot 87 further has a second segment 103 angularly offset from first segment 101. Pin assembly 91 and camming slot 87 define a first camming mechanism.

A pair of piston cylinders 37 are attached to body 25. Each cylinder 37 has an internal chamber accessible to second bore 53 and they are elongated coaxially with axis 54. Open end 111 of each piston cylinder 37 is inserted into second bore 53 and secured in its respective fully installed position relative to body 25 by way of a pair of circumferentially compressible roll pins 113. Ends of each roll pin are stationarily secured in openings 115 in body 25 while a middle portion of each roll pin 113 engages in a circular groove 117 machined in each piston cylinder 37. Accordingly, each piston cylinder 37 can be rotated 360 degrees relative to body 25, even when fully inserted and attached to body 25. This allows fluid carrying tubes, hoses and fittings which are attached to an inlet 121 to be repositioned free of any obstructions in the factory or to improve tube routing by minimizing bends.

As can best be observed in FIGS. 5, 6, 9 and 10, piston 35 is configured to have a pair of opposed piston heads 131 and 133 and a driving or camming member 135 mounted therebetween. Piston 35 is movably located inside of second bore 53 and piston cylinders 37. An elastomeric O-ring or other shaped seal 137 is secured within a groove 139 in each piston head 131 and 133. A camming slot 141 is internally located in camming member 135 of piston 35. Camming slot 141 preferably has a closed looped configuration defined by a first elongated segment 143 elongated in generally the same direction as axis 54. Axis 54 also defines the advancing and retracting direction of piston 35 within second bore 53. More specifically, an elongated axis of first segment 143 is approximately 9 degrees offset from axis 54. Camming slot 141 further has a second camming segment 145 angularly offset from first segment 143. Four detented step-like formations 147 are machined as part of one side of first camming segment 143. Each detent formation 147 provides approximately 1/5,000 of an inch of a step relative to the adjacent one.

A second pin assembly 161 is secured to the distal end of clamping member 33. Pin assembly 161 includes a pair of outboard rollers 163 which are affixed onto a central elongated pivot pin 165 by way of snap rings 167. Outer rollers 163 longitudinally travel within longitudinally elongated slots 169 machined in body 25. Outer roller 163 are maintained in their outboard positions by an inward flange 171 offset from each longitudinally body slot 169.

A middle roller 181 is journalled around an intermediate portion of pivot pin 165 and rides within camming slot 141 of piston 35. Middle roller 181 is laterally trapped between an inwardly stepped lateral face 183 of clamping member 33 and an inwardly stepped face 185 of camming member 135 adjacent camming slot 141. There is clearance between the secondary slot in stepped face 185 and pivot pin 165. Pivot pin 165 is rotatably secured within aperture 89 of clamping member 33. Camming slot 141 and second pin assembly 161 define a second camming mechanism.

Body 25 and piston cylinders 37 are preferably machined on a lathe from aluminum bar stock having a circular cross sectional shape. Thus, the outer and inner surfaces of these parts predominantly have circular-cylindrical shapes with secondary holes and slots machined therein. Piston 35, locating pin 31 and collar 39 are preferably machined on a lathe from steel bar stock having a circular cross sectional shape with other grooves and holes being machined thereafter. Clamping member 33 is preferably laser cut from a sheet of steel and then milled for the extra slots and apertures.

The second preferred embodiment of locking pin clamp 21 of the present invention is shown in FIG. 8. In this embodiment, one of the cover plates 201 (see FIG. 5) of the first preferred embodiment is removed and replaced by a switch package 203. Switch package 203 includes a three-dimensionally shaped housing or cover 205 within which is secured a pair of proximity switch sensors 207 and 209. Sensors 207 and 209 are of an inductive type such as that which can be purchased from Turck Inc. or Namco. Housing 205 is fastened to the outside of clamp body 25 (see FIG. 5) by bolts such that sensing portions of sensors 207 and 209 are exposed to one of more of the inner bores of body 25. Housing 205 is sealed against body 25 thereby allowing the parts internal to body 25 and housing 205 to be greased and sealed for a longer life and improved durability. Sensors 207 and 209 inductively sense the location of the adjacent outer roller 163 and thereby send the appropriate electrical or fiber optic signal to the fluid control unit that controls the amount and direction of pneumatic pressure applied within the piston cylinders. The electrical or fiber optic cables are connected via the coaxial or fiber optic connector 211 projecting from housing 205.

Figure 13:
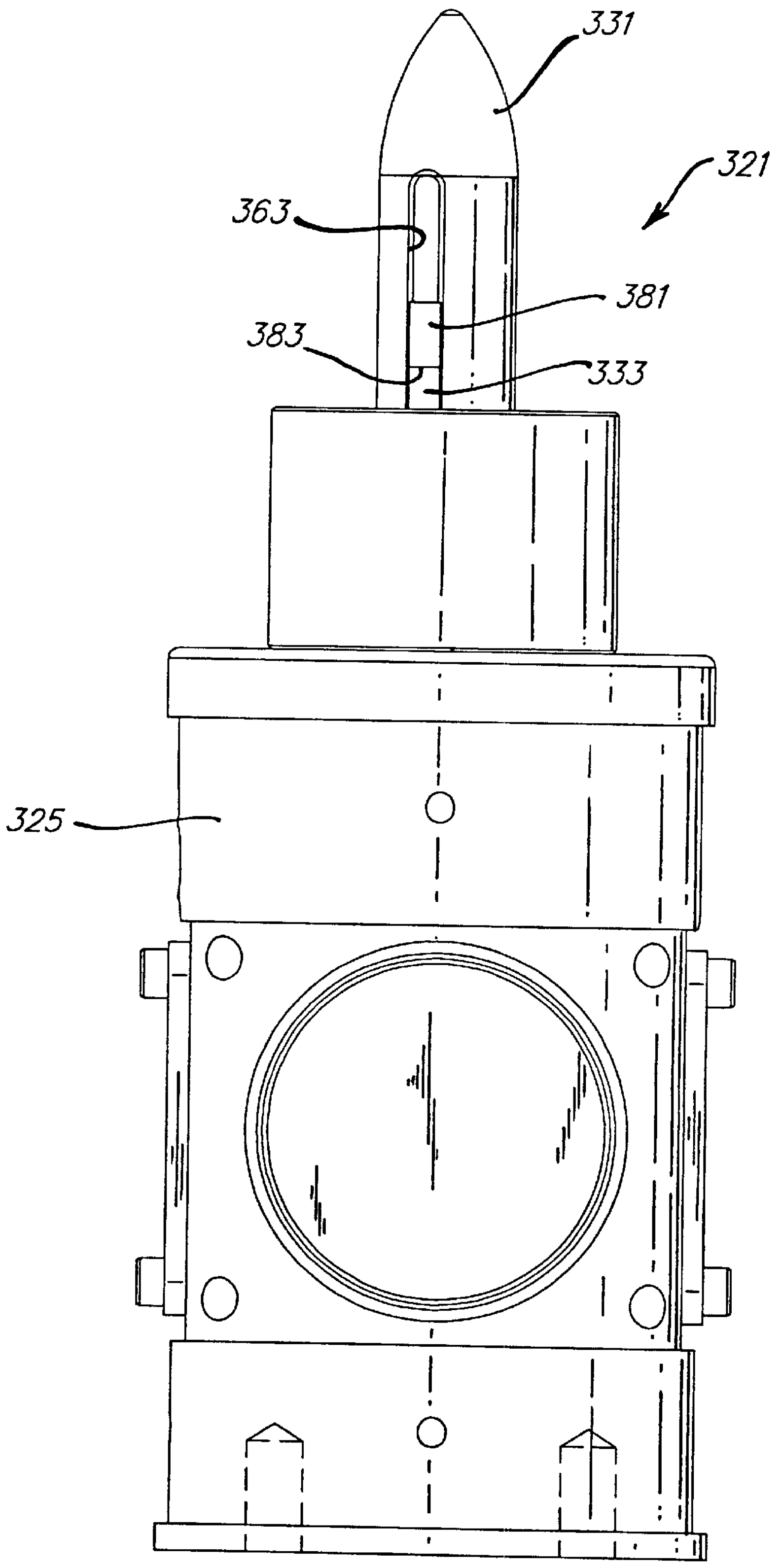
FIG. 13 is a side elevational view showing the third preferred embodiment of a locking pin clamp of the present invention.
Figure 14:
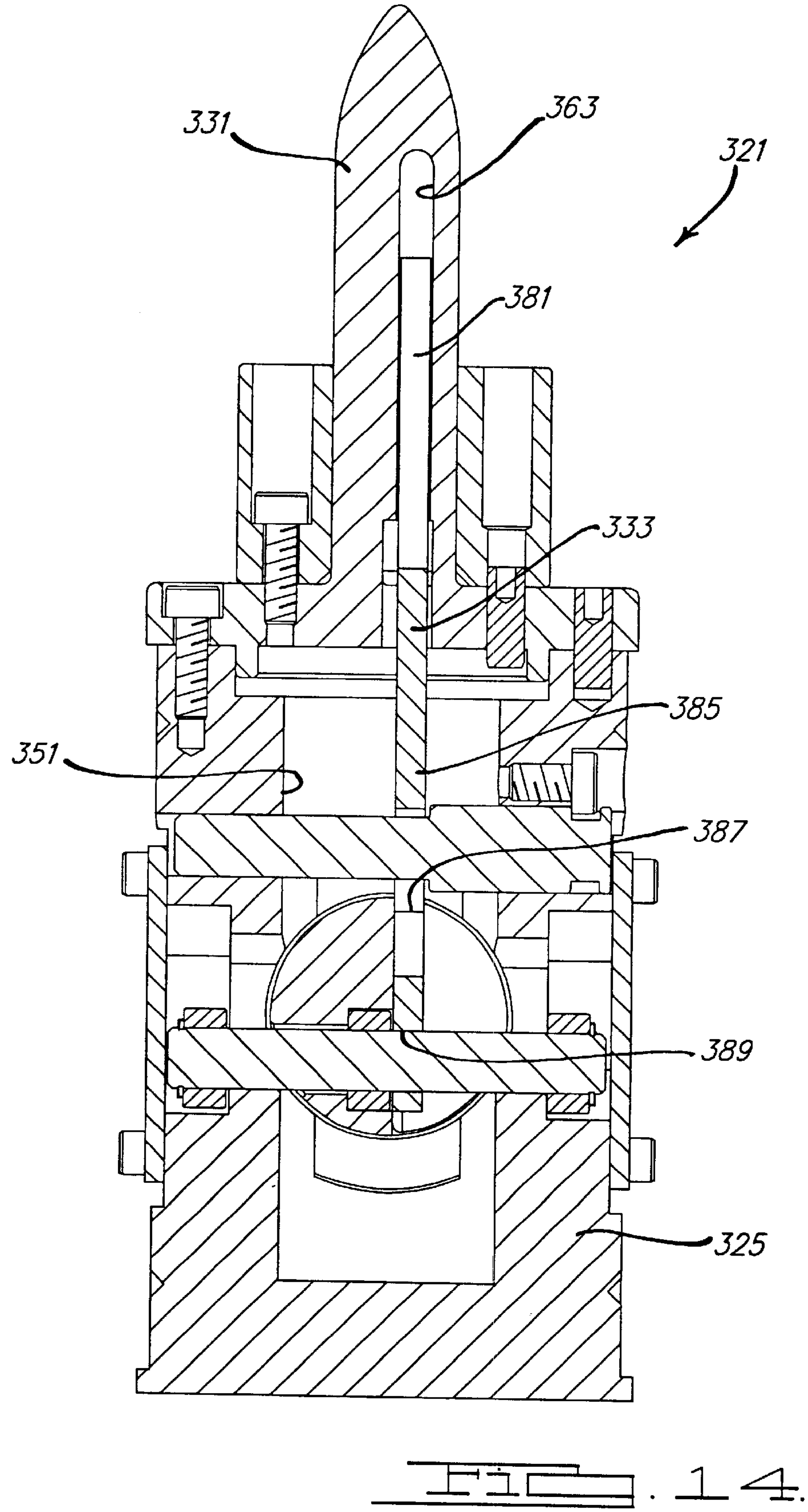
FIG. 14 is a cross sectional view, like that of FIG. 6, showing the third preferred embodiment locking pin clamp.

The third preferred embodiment of a locking pin clamp 321 is shown in FIGS. 13 and 14. This embodiment is similar to the first preferred embodiment except that a clamping member 333 has a single clamping arm 381 with a curved portion that ends in a single clamping surface 383. Clamping member 333 further has a working portion 385 that contains a camming slot 387 and a hole 389 adjacent a distal end. Working portion 385 is movably positioned in a first bore 351 of a body 325. Clamping member 333 has a generally J-shaped side view configuration. Furthermore, a locating pin 331 has a generally pointed distal end projecting above a single longitudinally elongated opening 363 in locating pin 331. Opening 363 is laterally offset from a longitudinal centerline of locating pin 331 thereby providing four equally spaced locating points for a workpiece.

Figure 10:
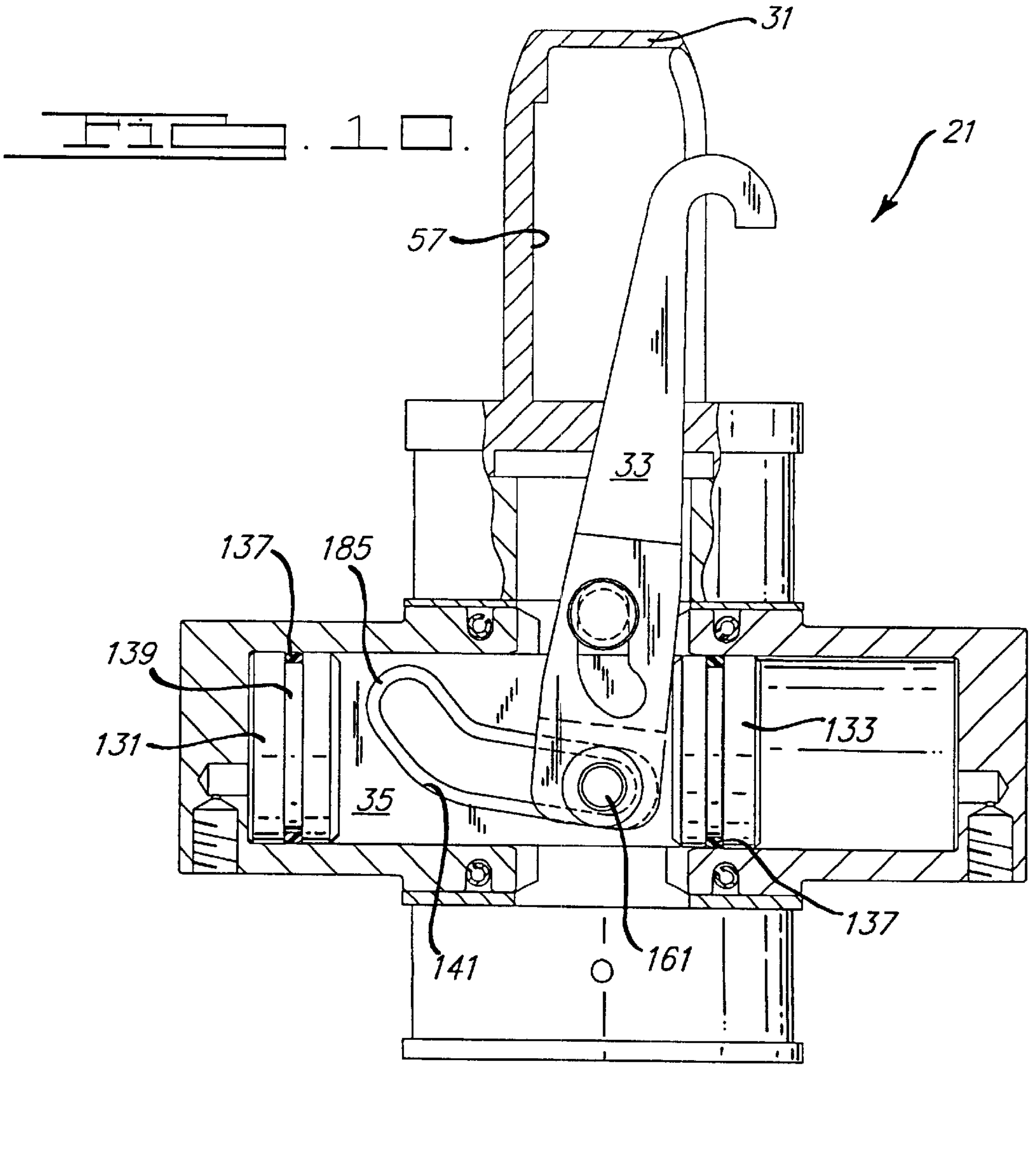
FIG. 10 is a partially fragmentary side elevational view showing a clamping member of the first preferred embodiment locking pin clamp, disposed in a clamping position.
Figure 11:
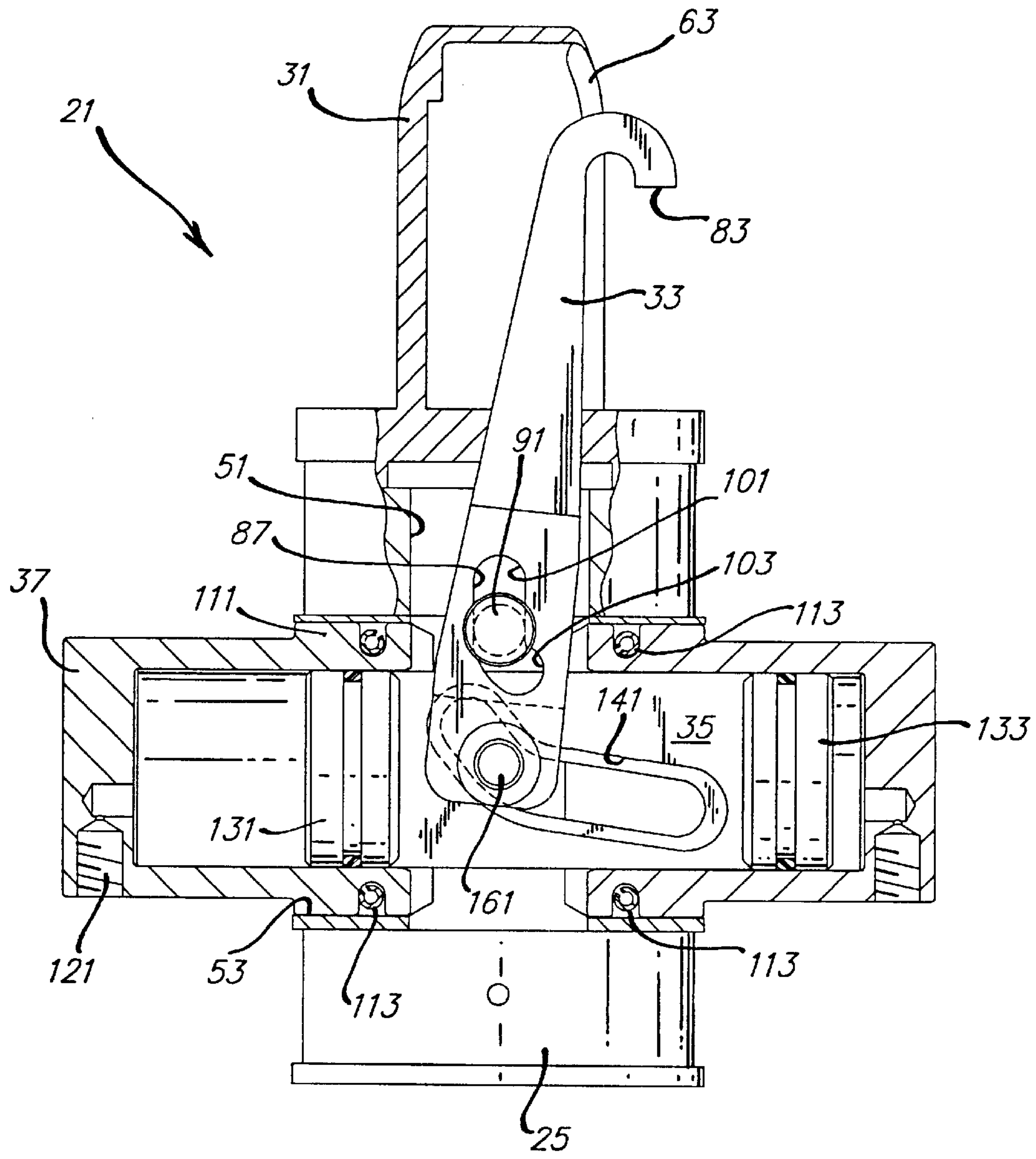
FIG. 11 is a partially fragmentary side elevational view showing the clamping member of the first preferred embodiment locking pin clamp, disposed in an intermediate movement position.
Figure 12:
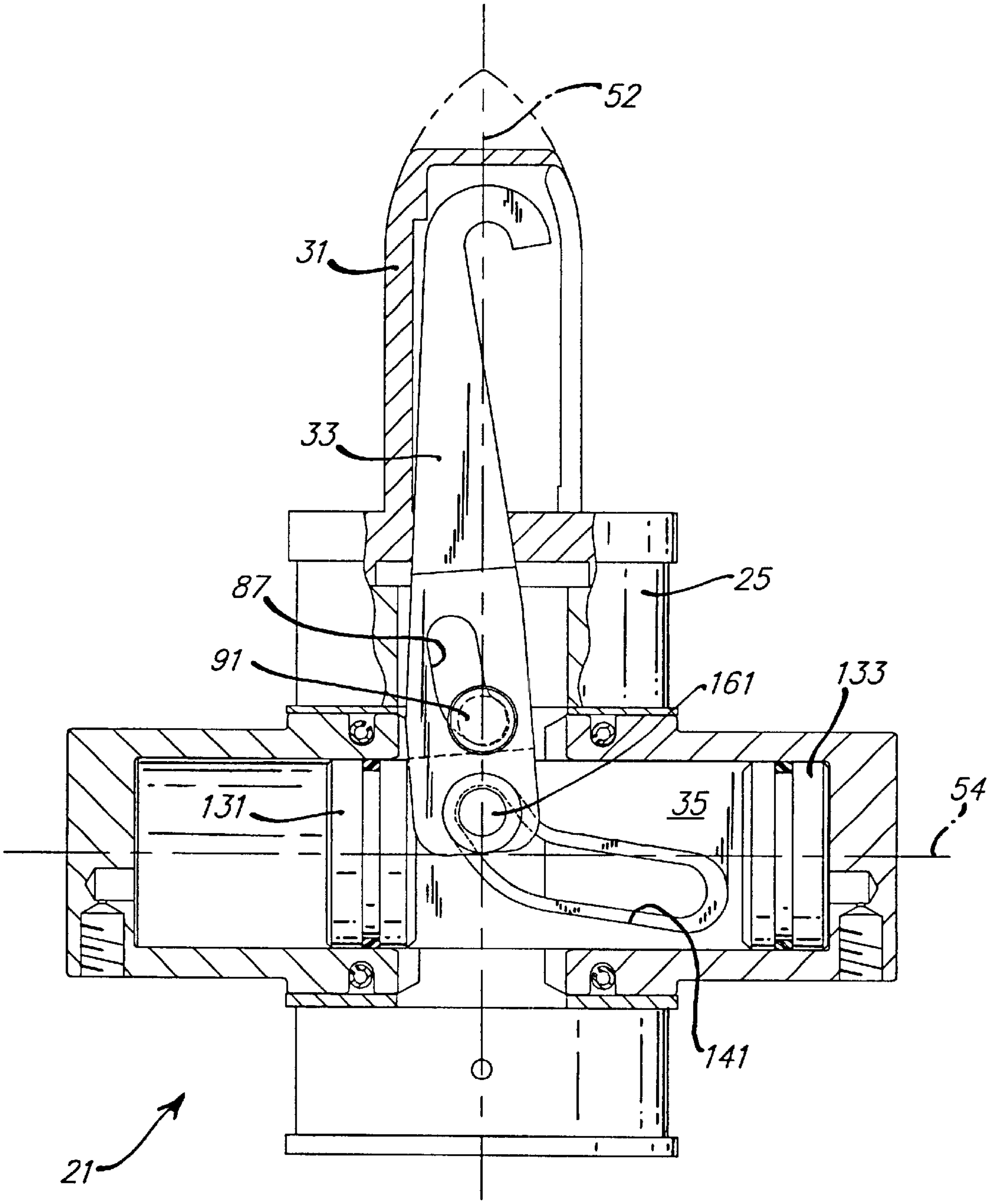
FIG. 12 is a partially fragmentary side elevational view showing the clamping member of the first preferred embodiment locking pin clamp, disposed in a retracted position.

The operation of the first preferred embodiment locking pin clamp 21 of the present invention can be observed with reference to FIGS. 10–12. When pneumatic air pressure is applied against piston head 133, piston 35 is advanced in a first direction along axis 54. This will move clamping member 33 from the fully retracted position within the internal cavity of locating pin 31, as shown in FIG. 12, to an intermediate rotated position, as shown in FIG. 11. This initial advancing movement from FIG. 12 to that of FIG. 11, is achieved by sliding pin assembly 161 down the steeply inclined leading segment of camming slot 141. Concurrently, clamping member 33 is moved from a fully extended position, along the steeply inclined segment of camming slot 87, downward and further into body 25 by interfacing with pin assembly 91. This double camming mechanism arrangement causes an approximately 5 degree rotation of clamping member 33 relative to body 25 such that clamping surfaces 83 of clamping member 33 pass through openings 63 and are externally accessible beyond locating pin 31 and body 25.

Further advancement of piston 35 causes pin assemblies 161 and 91 to further ride along their respective camming slots 141 and 87. This drives clamping member 33 to a fully clamping position, as illustrated in FIG. 10 (with collar 39 removed for clarity). Approximately ten millimeters of linear movement is achieved in the longitudinal direction, generally perpendicular to axis 54, between the fully retracted and fully clamping positions. In the clamping position of FIG. 10, middle roller 181 of pin assembly 161 engages the corresponding detent formation 147 (see FIG. 9). This detent-to-camming arrangement, in addition to the somewhat perpendicular movement geometries, encourage clamping member 33 to maintain its clamping (or partial clamping) position engaging the workpiece even if pneumatic pressure is lost or undesirably reduced. Piston 35 is retracted by applying pneumatic pressure against the opposite piston head 131 to provide a reversal of the above discussed motions.

While various embodiments of the locking pin clamp have been disclosed, it will be appreciated that other modifications may be made without departing from the spirit of the present invention. For example, a piston rod can be employed between the piston heads and the camming member. Furthermore, many of the pin assemblies and camming slots can be reversed between the interfacing parts. Moreover, the clamping member can have other shapes such that the clamping surface has a different orientation relative to the piston advancing direction. The clamping, piston, piston cylinder and camming configurations can be used without a locating pin although the preferred embodiment of the present invention is optimized with the locating pin arrangement to provide enhanced advantages. While various materials, shapes and manufacturing processes have been disclosed, it will be appreciated that others can be also employed. It is intended by the following claims to cover these and any other departures from the disclosed embodiments which fall within the true spirit of this invention.

The invention claimed is:

1. A clamp comprising:

a piston head operably advancing in a first linear direction;

a clamp body;

a driving member coupled to the piston head, the driving member being movable in the first direction in concert with the piston head, the driving member being movable at least partially inside the body;

a clamping member movably coupled to the driving member, the clamping member being at least partially movable in a second direction substantially perpendicular to the first direction when moving from a retracted position to a clamping position;

a camming surface operably controlling at least a portion of the movement of the clamping member relative to the driving member; and a workpiece-locating pin externally projecting from the body.

2. The clamp of claim 1 wherein the clamping member is rotated relative to the body when moved between the retracted position and the clamping position.

3. A clamp comprising:

a piston head operably advancing in a first linear direction;

a clamp body;

a driving member coupled to the piston head, the driving member being movable in the first direction in concert with the piston head, the driving member being movable at least partially inside the body;

a clamping member movably coupled to the driving member, the clamping member being at least partially movable in a second direction substantially perpendicular to the first direction when moving from a retracted position to a clamping position;

a workpiece-locating pin externally projecting from the body;

a first camming slot having a first segment elongated in substantially the second direction and a second segment angularly offset from the second direction, the first camming slot being located on one of the clamping member and the body; and a first camming pin assembly ridable along the first camming slot and being affixed to the other one of the clamping member and the body;

wherein the first camming slot and the first camming pin assembly are operable to rotate the clamping member relative to the body.

4. The clamp of claim 3 further comprising:

a second camming pin assembly affixed to the clamping member; and a second camming slot located on the driving member, the second camming slot having a first segment elongated in substantially the first direction and a second segment angled in an offset manner from the first segment;

wherein the second pin assembly of the clamping member operably rides along the second camming slot, advancing and retracting movement of the piston head and second camming slot operably drive the clamping member between the retracted and clamping positions.

5. The clamp of claim 4 wherein the clamping member has a clamping surface, and the first camming slot is substantially located between the clamping surface of the clamping member and the second camming pin assembly.

6. The clamp of claim 1 wherein the clamping member has a clamping surface that retracts inside the locating pin.

7. The clamp of claim 6 wherein the locating pin is elongated in the second direction.

8. A clamp comprising:

a first piston head operably advancing in a first linear direction;

a clamp body;

a driving member coupled to the first piston head, the driving member being movable in the first direction in concert with the first piston head, the driving member being movable at least partially inside the body;

a second piston head coupled to the driving member, the driving member being mounted between the piston heads;

a clamping member movably coupled to the driving member, the clamping member being at least partially movable in a second direction substantially perpendicular to the first direction when moving from a retracted position to a clamping position; and a workpiece-locating pin externally projecting from the body.

9. The clamp of claim 1 wherein pneumatic pressure is operably applied against the piston head to drive the driving member and the clamping member.

10. The clamp of claim 1 wherein the clamping member has a clamping surface substantially facing toward the body, has a substantially J-shaped configuration, and is operable to clamp a workpiece between the clamping surface and the body.

11. A clamp comprising:

a piston head operably advancing in a first linear direction;

a clamp body;

a driving member coupled to the piston head, the driving member being movable in the first direction in concert with the piston head, the driving member being movable at least partially inside the body;

multiple detents located on a camming surface of the driving member;

a clamping member movably coupled to the driving member, the clamping member being at least partially movable in a second direction substantially perpendicular to the first direction when moving from a retracted position to a clamping position; and a workpiece-locating pin externally projecting from the body.

12. A clamp comprising:

a workpiece-clamping member;

a camming member having an elongated camming surface coupled to the clamping member;

a first piston head coupled to a first end of the camming member; and a second piston head coupled to an opposite second end of the camming member;

wherein fluid pressure applied against the first piston head causes the camming member to move in a first direction and fluid pressure operably applied against the second piston head causes the camming member to move in a second direction substantially opposite the first direction, and the clamping member operably moves in response to movement of the camming member.

13. The clamp of claim 12 wherein the clamping member has a clamping surface which moves between a retracted position and a clamping position in a third direction substantially perpendicular to the first direction.

14. The clamp of claim 12 wherein the clamping member rotates when moved from a retracted position to a clamping position.

15. The clamp of claim 12 further comprising a pair of camming mechanisms causing the clamping member to move when the camming member advances, at least one of the camming mechanisms coupling the clamping member to the camming member.

16. The clamp of claim 12 further comprising a workpiece locating pin having an opening operable to receive at least a portion of the clamping member.

17. A clamp comprising:

a body having a first internal bore and a substantially perpendicular second internal bore;

a clamping member at least partially located in the first bore and having a workpiece-clamping surface;

a first camming mechanism coupling the clamping member to the body, the first camming mechanism including an elongated camming surface;

a fluid powered piston operably movable in an advancing direction coaxial with an axis of the second bore; and a second camming mechanism coupling the clamping member to the piston, the second camming mechanism including an elongated camming surface;

the first and second camming mechanisms being operable to rotate and linearly move the clamping member relative to the body; and the first mechanism being located substantially between the second mechanism and the clamping surface.

18. The clamp of claim 17 further comprising a hollow workpiece-locating pin extending from the body.

19. The clamp of claim 18 further comprising a piston cylinder projecting from said body substantially perpendicular to an elongated axis of the locating pin, the body having a substantially circular-cylindrical external shape.

20. The clamp of claim 17 wherein the first camming mechanism includes:

a camming slot located on the clamping mechanism, the camming surface defining part of the slot; and a pin and roller assembly affixed to the body.

21. The clamp of claim 17 wherein the second camming mechanism includes:

a camming slot located on the piston, the camming surface defining part of the slot; and a pin and roller assembly affixed to the clamping member.

22. The clamp of claim 17 wherein the piston includes a pair of piston heads and a camming segment located between the piston heads, the camming segment of the piston defining at least part of the second mechanism.

23. A clamp comprising:

a body;

a clamping member having a clamping surface movable from a workpiece-clamping position to a retracted position in a first direction, the clamping member having a coupling end located inside the body;

a driving member at least partially located in the body;

a fluid powered piston head coupled to the driving member, the piston head and driving member being movable in a second direction substantially perpendicular to the first direction;

a camming mechanism coupling the clamping member to the driving member such that movement of the piston head and driving member causes the clamping surface to move between the clamping and retracted positions, the camming mechanism including an elongated camming surface oriented within about 45 degrees of the second direction; and at least one detent located on the camming surface to deter the clamping surface from moving from the clamping position if fluid pressure against the piston head is less than a desired amount.

24. The clamp of claim 23 further comprising multiple detents located on the camming surface.

25. The clamp of claim 24 wherein the multiple detents are arranged adjacent to each other in a step-like fashion.

26. The clamp of claim 23 wherein the camming mechanism includes a pin affixed to the clamping member, and the camming surface is located on the driving member.

27. The clamp of claim 26 wherein the camming mechanism includes an elongated slot internally located in the driving member, the camming surface and the detent are part of the edge defining the slot.

28. The clamp of claim 23 further comprising a second camming mechanism coupling the clamping member to the body and operably causing the clamping member to rotate as well as linearly move in the first direction when the piston head and driving member are moved.

29. The clamp of claim 23 further comprising a second piston head, the driving member being located between the piston heads.

30. The clamp of claim 23 further comprising a hollow workpiece-locating pin extending from the body.

31. A clamp comprising:

a workpiece-clamping arm movable between a clamping position and a retracted position;

a driving member movable between an advanced position and a retracted position;

a camming mechanism coupling the clamping member to the driving member, the camming mechanism including a continuously enclosed internal slot having an elongated camming surface; and a set of detents located on the camming surface to assist in maintaining a desired position of the clamping member.

32. The clamp of claim 31 further comprising a fluid powered piston head coupled to the driving member, the detents assisting in maintaining the clamping member in a desired position when the desired fluid pressure is not present.

33. The clamp of claim 31 further comprising a workpiece locating pin having an opening, and a portion of the arm operably passing through the opening.

34. A pin clamp comprising:

a body having an internal bore;

a workpiece-locating pin externally extending from the body, the locating pin being substantially hollow and substantially coaxial with the bore, at least four workpiece-contacting surfaces located on an external side surface of the locating pin in an equidistant manner, at least one opening located in the external side surface of the locating pin; and a workpiece-engaging clamping member having a section located inside the bore of the body and having a clamping surface retractable inside the locating pin, the clamping surface being extendable outside of the locating pin through the opening in the locating pin when the clamping member is moved from a retracted position to a workpiece-clamping position.

35. The clamp of claim 34 wherein the clamping surface includes bifurcated and spaced apart clamping surface portions.

36. The clamp of claim 35 further comprising a second opening in the external side surface of the locating pin oriented substantially parallel to the first opening, each of the bifurcated clamping surface portions being movable through the corresponding one of the openings.

37. The clamp of claim 36 wherein one of the workpiece-contacting surfaces is located between the openings.

38. The clamp of claim 34 further comprising a piston having a piston head and a camming segment coupled to the clamping member.

39. The clamp of claim 34 wherein the locating pin has a substantially tapered distal end opposite the body.

40. The clamp of claim 34 wherein the locating pin is operable to transversely locate the workpiece relative to the body and the clamping member is operable to longitudinally clamp the workpiece between the clamping surface and the body.

41. A clamp comprising:

a hollow clamp body;

a workpiece-engaging clamping member coupled to the body;

a piston cylinder;

a fluid-powered piston operably driving the clamping member, the piston being movable inside the piston cylinder; and a fastener attaching the piston cylinder to the body when the piston cylinder is in a fully installed position relative to the body;

the piston cylinder being rotatable relative to the body when in the fully installed position with the fastener fully engaged.

42. The clamp of claim 41 further comprising a circular groove is located on a first external surface of the piston cylinder, the first external surface being located inside a portion of the body when in the fully installed position.

43. The clamp of claim 42 wherein the fastener is a roll pin affixed to the body and engaging the groove of the piston cylinder, and the roll pin secures the piston cylinder relative to the body in the fully installed position while allowing the piston cylinder to rotate relative to the roll pin and body.

44. The clamp of claim 41 further comprising a second piston cylinder mounted to the body, the second piston cylinder being rotatable relative to the body when in a fully installed position.

45. The clamp of claim 44 wherein the piston cylinders are coaxially aligned with each other.

46. The clamp of claim 41 wherein the piston cylinder is rotatable 360 degrees relative to the body even after being located in the fully installed position.

47. The clamp of claim 41 wherein the piston cylinder is secured to the body in a thread-free manner.

48. The clamp of claim 41 wherein an elongated direction of the clamping member is substantially perpendicular to a movement axis of the piston as viewed when the clamping member is located in the retracted position.

49. A clamp comprising:

a clamp body;

a workpiece-engaging clamping member;

a piston cylinder;

a fluid-powered piston operably moving the clamping member, the piston being movable inside the piston cylinder; and a fastener attaching the piston cylinder to the body when the piston cylinder is substantially in a fully installed position relative to the body;

the piston cylinder being rotatable relative to the body when substantially in the fully installed position and with the fastener at least partially engaged.

50. The clamp of claim 49 wherein the piston cylinder is rotatable 360 degrees relative to the body even after being located in the fully installed position.

51. The clamp of claim 49 wherein the piston cylinder is secured to the body in a thread-free manner.

52. The clamp of claim 49 wherein an elongated direction of the clamping member is substantially perpendicular to a movement axis of the piston as viewed when the clamping member is located in the retracted position.

53. The clamp of claim 49 wherein the fastener is a roll pin, the piston is pneumatically powered and further comprising a camming member coupling the piston to the clamping member.

54. The clamp of claim 3 wherein the clamping member has a clamping surface that retracts inside the locating pin.

55. The clamp of claim 3 wherein the clamping member has a clamping surface substantially facing toward the body, has a substantially J-shaped configuration, and is operable to clamp a workpiece between the clamping surface and the body.

56. The clamp of claim 8 wherein the clamping member is rotated relative to the body when moved between the retracted position and the clamping position.

57. The clamp of claim 8 wherein the clamping member has a clamping surface that retracts inside the locating pin.

58. The clamp of claim 8 wherein the clamping member has a clamping surface substantially facing toward the body, has a substantially J-shaped configuration, and is operable to clamp a workpiece between the clamping surface and the body.

59. The clamp of claim 11 wherein the clamping member is rotated relative to the body when moved between the retracted position and the clamping position.

60. The clamp of claim 11 wherein the clamping member has a clamping surface that retracts inside the locating pin.

61. The clamp of claim 11 wherein the clamping member has a clamping surface substantially facing toward the body, has a substantially J-shaped configuration, and is operable to clamp a workpiece between the clamping surface and the body.

* * * * *

UNITED STATES PATENT AND TRADEMARK OFFICE

CERTIFICATE OF CORRECTION

PATENT NO. : 6,378,855 B1 Page 1 of 1
DATED : April 30, 2002
INVENTOR(S) : Edwin G. Sawdon and Brian D. Petit It is certified that error appears in the above-identified patent and that said Letters Patent is hereby corrected as shown below:

Column 4,
Line 30, "roller" should be -- rollers --.
Line 66, (first occurrence), "of" should be -- or --.

Column 10,
Line 51, after "groove" delete "is".

Signed and Sealed this

Eighth Day of April, 2003

JAMES E. ROGAN
*Director of the United States Patent and Trademark Office*